United States Patent
Kumar et al.

(10) Patent No.: US 11,689,498 B1
(45) Date of Patent: Jun. 27, 2023

(54) INTERNET PROTOCOL ADDRESS GENERATION

(71) Applicant: RAKUTEN MOBILE, INC., Tokyo (JP)

(72) Inventors: Nitish Kumar, Madhya Pradesh (IN);
Pawan Shriwas, Madhya Pradesh (IN);
Niyank Bam, Madhya Pradesh (IN);
Pratik Mahajan, Madhya Pradesh (IN);
Mohammodh Irfan, Madhya Pradesh (IN); Mahesh Hanwatkar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/667,550

(22) Filed: Feb. 9, 2022

(51) Int. Cl.
  *G06F 15/177* (2006.01)
  *G06F 15/16* (2006.01)
  *H04L 61/5007* (2022.01)
  *H04L 61/5046* (2022.01)

(52) U.S. Cl.
  CPC ...... *H04L 61/5007* (2022.05); *H04L 61/5046* (2022.05)

(58) Field of Classification Search
  CPC .............. H04L 61/5007; H04L 61/5046
  See application file for complete search history.

(56) References Cited

U.S. PATENT DOCUMENTS

| | | | |
|---|---|---|---|
| 2003/0217122 A1* | 11/2003 | Roese | H04L 63/107 709/219 |
| 2004/0205247 A1* | 10/2004 | Ahn | H04L 61/25 709/245 |
| 2006/0248083 A1* | 11/2006 | Sack | G06F 21/6218 707/999.009 |
| 2010/0142410 A1 | 6/2010 | Huynh Van et al. | |
| 2013/0318198 A1 | 11/2013 | Zuk et al. | |
| 2015/0095505 A1* | 4/2015 | Antony | H04L 61/5046 709/228 |
| 2016/0103911 A1* | 4/2016 | Logue | H04L 67/12 707/695 |
| 2018/0069829 A1* | 3/2018 | Ramasamy | H04L 41/12 |
| 2018/0367501 A1* | 12/2018 | Khan | H04L 41/22 |
| 2019/0327274 A1* | 10/2019 | Baumgart | H04L 63/101 |

FOREIGN PATENT DOCUMENTS

CN        103812954 B    1/2018

* cited by examiner

*Primary Examiner* — Christopher B Robinson
(74) *Attorney, Agent, or Firm* — Hauptman Ham, LLP

(57) ABSTRACT

A method includes receiving, from a first user, a request to create an Internet Protocol (IP) template for a device connected to a network. The method further includes receiving an IP schema for the network. The method further includes receiving a list of IP template parameters associated with the network, wherein the IP template parameters includes information about a part of the network. The method further includes determining whether the first user is authorized to create the IP template. The method further includes generating, in response to a determination that the first user is authorized, an IP template based on the IP template parameters and the IP schema for the part of the network. The method further includes generating an IP address based on the IP template.

20 Claims, 5 Drawing Sheets

INTERNET PROTOCOL ADDRESS GENERATION

BACKGROUND

Internet Protocol (IP) addresses are unique identifiers for each device within a network. IP addresses help with network interface identification as well as location information. IP addresses are often arbitrarily assigned without any characteristics within the IP address that provide information about the device or the network. In some instances, the arbitrary assigning of IP addresses also causes a redundancy or conflict within the assigned IP address. Arbitrarily assigned IP addresses often are used in combination with a database to track a correlation between the device and the IP address that was assigned. Inaccuracies or corruption of such a database would present problems with precision in device tracking within the network.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
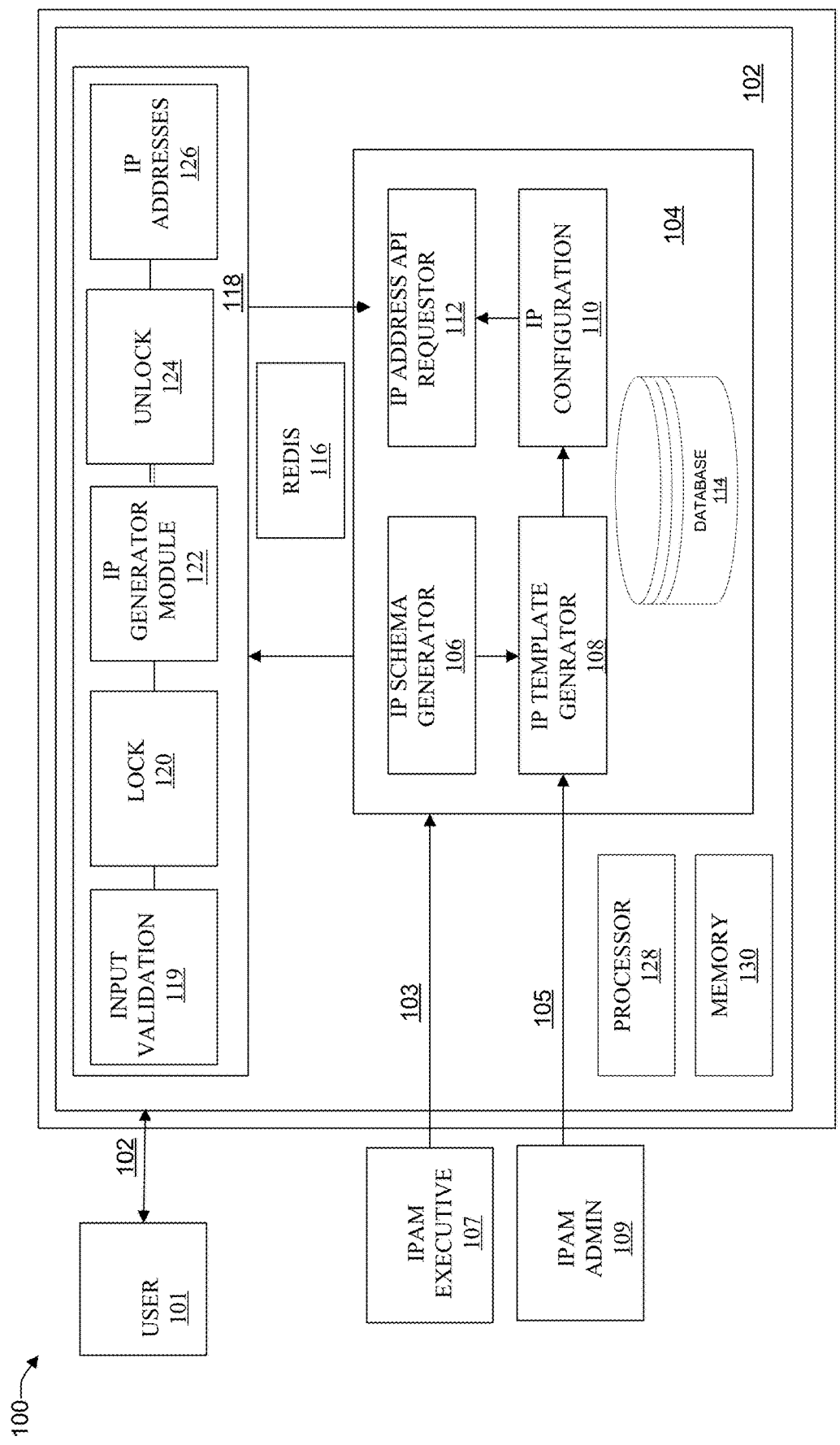
FIG. 1 is a diagram of a system for internet protocol address generation, according to at least one embodiment of the present system.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In some embodiments, a system generates an IP address with a logical assignment of IP addresses in a cloud environment. The system is able to generate an IP template based on an IP schema. In some examples, an IP schema is based on IP network parameter information such as the vendor of a device, a service category of a device or a part of the network, a service type or device type specific assignment logic. In some embodiments, the system is able to generate an IP template to configure one or more IP address associated with a category, type of service or a vendor based on the IP schema. In some embodiments, the system is able to generate an IP address using the IP template that includes one or more properties as part of the IP address to identify related devices.

In some embodiment, the IP addresses generated using the IP template allow the system to increase consistency, reduce the time spent on provisioning new devices, reduce or prevent potential conflicts in IP addresses, and provide meaningful and identifiable IP addresses on the network.

In radio access networks, arbitrary assignment of IP addresses without identifiable bits in IP addresses reduces trackability of devices, and increases a risk of redundancy or conflicts in IP addresses.

FIG. 1 is a diagram of a system 100 for IP Schema, IP template and IP address generation, according to at least one embodiment of the present system. The diagram includes system 100 for hosting a cloud architecture 102. In some embodiments, the system 100 includes components described hereinafter in FIG. 5. In some embodiments, the system 100 hosts a cluster of servers, such as a cloud service. In some embodiments, the system 100 hosts a public cloud. In some embodiments, the system 100 hosts a private cloud.

In some embodiments, the cloud architecture 102 includes a processor 128 and a memory 130. The cloud architecture 102 provides resources and manages services, such as virtual machines and services, to connect the resources on the cloud.

In some embodiments, the cloud architecture 102 is an Open RAN environment, the RAN is disaggregated into three main building blocks, the Radio Unit (RU), the Distributed Unit (DU), and the centralized Unit (CU). In some embodiments, the RU receives, transmits, amplifies, and digitizes the radio frequency signals. In some embodiments, the RU is located near, or integrated into an antenna to avoid or reduce radio frequency interference. In some embodiments, the DU and the CU form a computational component of a base station, sending the digitalized radio signal into the network. In some embodiments, the DU is physically located at or near the RU. In some embodiments, the CU is physically separated from the DU and RU and is located nearer the core. In some embodiments, the cloud environment 102 implements the Open RAN based on protocols and interfaces between these various building blocks (radios, hardware, and software) in the RAN. Examples of Open RAN interfaces include a front-haul between the Radio Unit and the Distributed Unit, mid-haul between the Distributed Unit and the Centralized Unit and Backhaul connecting the RAN to the core. In some embodiments, the DU and the CU are virtualized and run in a server or a cluster of servers.

The system 100 includes an IP address management server 104. In some embodiments, the IP management server 104 is a virtual server. In some embodiments, the IP address management server 104 is a process running on a cloud service, such as on the cloud architecture 102. In some embodiments, the IP address management server 104 includes an IP schema generator 106, an IP template generator 108, an IP configuration script 110, an IP address API requestor 112, and a database 114. In some embodiments, the IP address management server 104 interfaces with one or more users 107, 109 via an API. In some embodiments, the IP address management server 104 serves as a webpage over the network.

In some embodiments, the IP address management server 104 receives a request to generate an IP schema. For example, the user 107 requests the IP address management server 104 to generate an IP schema. In some embodiments, the IP schema generator 106 receives information from the database 114 regarding IP parameters of a network. In some embodiments, the IP parameters of the network include information about the hierarchy and interconnections between the various devices on a network, the layers in the network, the vendor of a network device, the service category the network device is used in, the type of service provided by the device, the type of service provided by the network device, or the like. For example, the IP schema generator in an Open RAN can receive information about the configuration and devices in different layers of the network such as the RU, DU and CU. In at least one example, the IP schema generator 106 receives information about the RU that includes information about the vendor of the RU, the frequency of the radio waves, the direction the RU is pointed in, the location of the RU, the type of service the RU provides such as a $4^{th}$ generation radio network, or the like.

In some embodiments, user 109 provides an IP planning design for logical assignment of IP addresses to devices. In some embodiments, the IP planning design is based on the IP parameters of the network that enables an authorized user, with information about the IP planning design, to discern information about the location of a device, the position of the device in the hierarchy of devices, or the like. For example, the authorized user allocates a specific portion of the IP address with a specific alpha-numeric bit entry to all devices located in New York. The alpha-numeric bit entry allows authorized users to use the IP address to decipher information about the device. Users without access to the IP planning design cannot discern much information without access to multiple devices on the network. This obscurity improves security of the IP addresses and the Open RAN. In some embodiments, the IP schema generator 106 receives position encoding for the IP parameters from the user 109. For example, the user 109 allocates bits with specific information that signifies the location of the device, the type of service provided by the device, or the like. In some embodiments, the system 100 receives via an application programming interface (API) such as a cloud API information that should be assigned to a specific bit in the IP address to indicate the location of service is New York. In some embodiments, the system 100 presents a graphical user interface (GUI) on a webpage to receive information. In some embodiments, the system 100 receives via the API information about a range of bits that are allocated to devices of the same type. For example, the range of bits following a fixed bit usable for all RUs in the network from a specific vendor. The range of bits is allocated to multiple RU's while the fixed bit identifies the vendor.

In some embodiments, the IP schema provides a list of bits that have specific meaning and a means to allocate the bits in specific positions to specific values, a range of values or both based on the IP planning information. In some embodiments, the IP address management server 104 determines whether the first user, such as user 109, is authorized to create the IP schema. In some embodiments, the first X bits in the IP address are assigned via the IP schema. For example, the IP schema generator 106 assigns the first 64 bits in a 128-bit IP address based on the IP schema; and the other bits are assigned without the use of the IP schema.

In some embodiments, the IP address management server 104 based on a determination that the user 107 is authorized to create the IP schema, generates the IP schema based on the position encoding for the IP parameters. In some embodiments, the IP address management server 104 requests approval from another user before the IP schema is created, such as from the user 109. In some embodiments, in response to a determination that the user 107 is not authorized to create the IP schema, the IP address management server 104 generates the IP address without the IP schema. In some embodiments, in response to a determination that the user 107 is not authorized to create the IP schema, the IP address management server 104 is configured to generate an alert, such as an audio or visual alert. In some embodiments, the alert is transmitted, such as wirelessly transmitted, to a system administrator, such as user 109.

In some examples, the operations of the components of the system 100 are executed by a processor 128 based on machine readable instructions stored in a non-volatile computer readable memory 130. In some examples, one or more of the operations of the components of the system 100 are executed on a different processor. In some examples, the operations of the components of the system 100 are split between multiple processors.

In some embodiments, the IP address management server 104 receives a request to generate an IP template. For example, the user 107 requests generation of an IP template. In some embodiments, an IP template describes assignment of bits in IP addresses for one or more devices that are requested or used often. For example, while deploying RUs a vendor requests IP addresses for each of the RUs, and any new equipment such as routers to connect the RU to the Open RAN. In some embodiments, the IP address management server 104 receives IP template parameters that define the relationships between the device and other devices that are often used in combination, the position of the combination of devices in a network, the configuration the combination of the devices, or the like. In some embodiments, frequent configurations are stored in a database, such as database 114, accessible by the IP template generator 108 for generating the IP template requested by the user 107. The IP address management server 104 provides an API to receive information from the user 107. In at least one example, the IP address management server 104 serves as a webpage with a graphical user interface to receive information from the user 107 about a part of the network.

In some embodiments, the IP address management server 104 receives a list of IP template parameters associated with the network from the database 114, wherein the IP template parameters includes information about a first part of the network, such as the information for configuring one or more devices that are used together or multiple devices of the same type or for the same service being deployed together. In some embodiments, the IP address management server 104 determines whether the first user is authorized to create the IP template. In some embodiments, the IP address management server 104 based on the determination that the first user is authorized, generates an IP template, using the IP template generator 108, based on IP schema, from the IP schema generator 106, for the first part of the network address. In some embodiments, in response to a determination that the user 107 is not authorized to create the IP template, the IP address management server 104 informs the user 107 that the user 107 does not have authorization to create the IP template. In some embodiments, in response to a determination that the user 107 is not authorized to create the IP template, the IP address management server 104 is configured to generate an alert, such as an audio or visual alert. In some embodiments, the alert is transmitted, such as wirelessly transmitted, to a system administrator, such as user 109. In some embodiments, the IP address management server 104 receives information about the first part of the network address from the user 107. In some embodiments, the IP address management server 104 requests approval from the user 107 before generating the IP template. In some examples, the IP template provides information such as the dynamic IP ranges for the devices that are part of a service or template based on the IP schema. For example, the IP template is able to further allocate bits in the IP address to the first part of the network address to allow differentiation of the devices, types, or the like. In some examples, the IP template simplifies deployment of IP addresses to devices and maintains consistency between configurations. In some examples, the user 107 dynamically generates an IP template for a specific deployment to help identify devices associated with that deployment.

In some embodiments, the IP address management server 104 receives a request from the user 107 on behalf of the user 101 to generate an IP address. In some embodiments, the IP address management server 104 generates an IP address based on the IP schema and the IP template. In some embodiments, the IP address management server 104 requests authorization from a second user, such as user 109, based on the IP template or the IP schema. For example, the IP configuration script 110 determines, based on the IP template or the IP schema, that the IP address requested is a device or a type of service that is located higher up in the hierarchy of the network that the user 107 is authorized to address and, based on the information request, additional authorization from the second user, such as user 109, is to be requested before generating the IP address.

In some embodiments, the IP address management server 104 receives a request from a user 101 to generate an IP address. The IP address management server 104 notifies the user 107 about the request. In some embodiments, the user 101 is not a member of the organization running the Open RAN. For example, the user 101 is a vendor who deploys RUs amongst other vendors. The IP address management server 104 shields the network by segregating the IP generation process from the vendors. In some embodiments, the IP address management server 104 receives an IP Template that applies to the request from the user 101. In some embodiment, the IP address management server 104 requests additional information from the user 107 based on the IP template and the IP schema. For example, the IP address management server 104 requests information, such as the superblock of the device or part of the network, a cluster ID of the device, a Fabric ID of the device, a radio control port node number, or a Node Type to generate an IP address.

In some embodiments, the IP address management server 104 generates the IP address using an IP address generation API. The IP address generation gateway 118 includes an input validation module 119, a lock module 120, an IP generator module 122, an unlock module 124 and an IP address generator 126. In some embodiments, the IP address generation gateway 118 validates the input from the user 101 based on the information from the IP schema and the IP template. In at least one example, the IP schema includes information about system assigned bits and user generated bits. The IP address management server 104 queries the database 114 via an API which links the IP generation gateway 118 and the IP address management server 104. The API firewalls the information about the network from the user 101. In some embodiments, the IP address management server 104 locks the IP address space using the lock module 120 to prevent conflicts when IP addresses are requested by two different vendors for the same device at the same time. In some embodiments, the IP generator module 122 generates the IP address and reserves the IP address for the device in communication with the IP address management server 104. For example, a DNS server generates the IP address.

In some embodiments, the IP generator module 112 communicates via an API with the IP address API requestor 112. In some embodiments, the unlock module 124 unlocks the IP address space other than the IP schema after the IP address is generated. In some embodiments, the IP address generator 126 acts as an interface to the IP address API requestor 112. In some embodiments, a caching server such as the Redis 116 server stores a list of IP addresses that are already issued to validate the information from the user 101.

In some embodiments, the IP generation gateway 118 requests authorization before the IP address is released to the user 101. In some embodiments, the IP generation gateway 118 requests authorization from the user 107 or the user 109.

Figure 2:
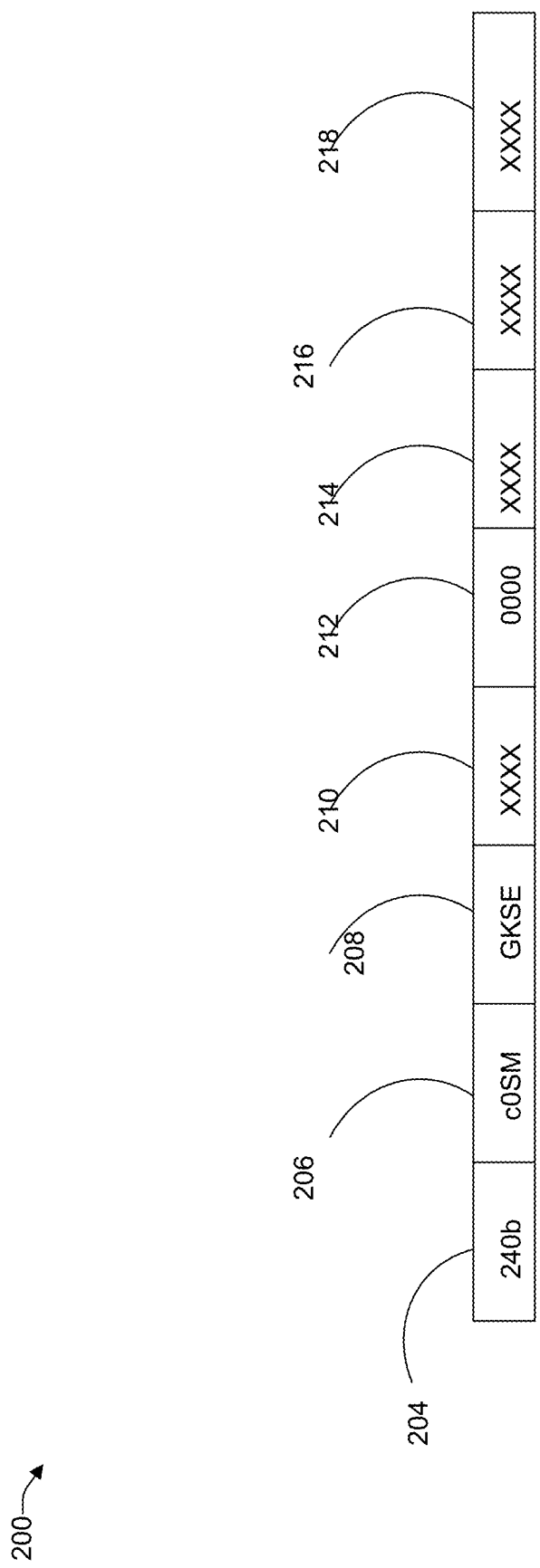
FIG. 2 is a diagram of an internet protocol address, according to at least one embodiment of the present system.

FIG. 2 is an exemplary IP schema generated, according to at least one embodiment of the present system. In some embodiments, the IP schema 200 is generated using the system 100 (FIG. 1). In some embodiments, a first four bits 204 of the IP schema 200 is based on the IP address block reserved for the service provider. For example, the first four bits 204 has a value of 240b. In some embodiments, a second four bits 206 of the IP schema indicates amongst other details, the super block identifier, or a mobile ring number. For example, the IP schema a bit in the second four bits 206, such as S indicates the super block in identifier which describes where the device or service is located. For example, the name of a city in an Open RAN deployment where the device is located. For example, the values indicate the service is located in New York, Washington DC, and the like. In some embodiments, four bits in a third four bits 208, such as K indicates the infrastructure or service associated with the device. Examples of infrastructure or service in the schema K includes user equipment type such as 4th Generation network, $5^{th}$ Generation network, Wi-Fi, infrastructure, service application, or the like. In some embodiments, a fourth four bits 210 of the IP schema are reserved for assignment to groups of devices during IP generation.

In some embodiments, the values indicated by XXXX are user configurable values that are selectable amongst one or more predetermined choices. In some examples, the configurable values are binary. In some examples, the configurable values are alpha-numeric digits to encode details about the network parameters. In some embodiments, the value indicated with S, and M are obtained from the user.

The IP schema 200 includes other sets of bits 212-218. These sets of bits are usable to provide other identifying information for the device. In some embodiments, one or more of the sets of bits 212-218 are usable to identify a deployment of the device. In some embodiments, one or more of the sets of bits 212-218 are usable to identify a type of the device. In some embodiments, one or more of the sets of bits 212-218 are usable to identify a hierarchical position of the device in the network. In some embodiments, one or more of the sets of bits 212-218 are usable to identify devices above or below the device in the hierarchy of the network. One of ordinary skill in the art would recognize that other combinations of identifying information within the IP schema 200 are within the scope of this disclosure.

Figure 3:
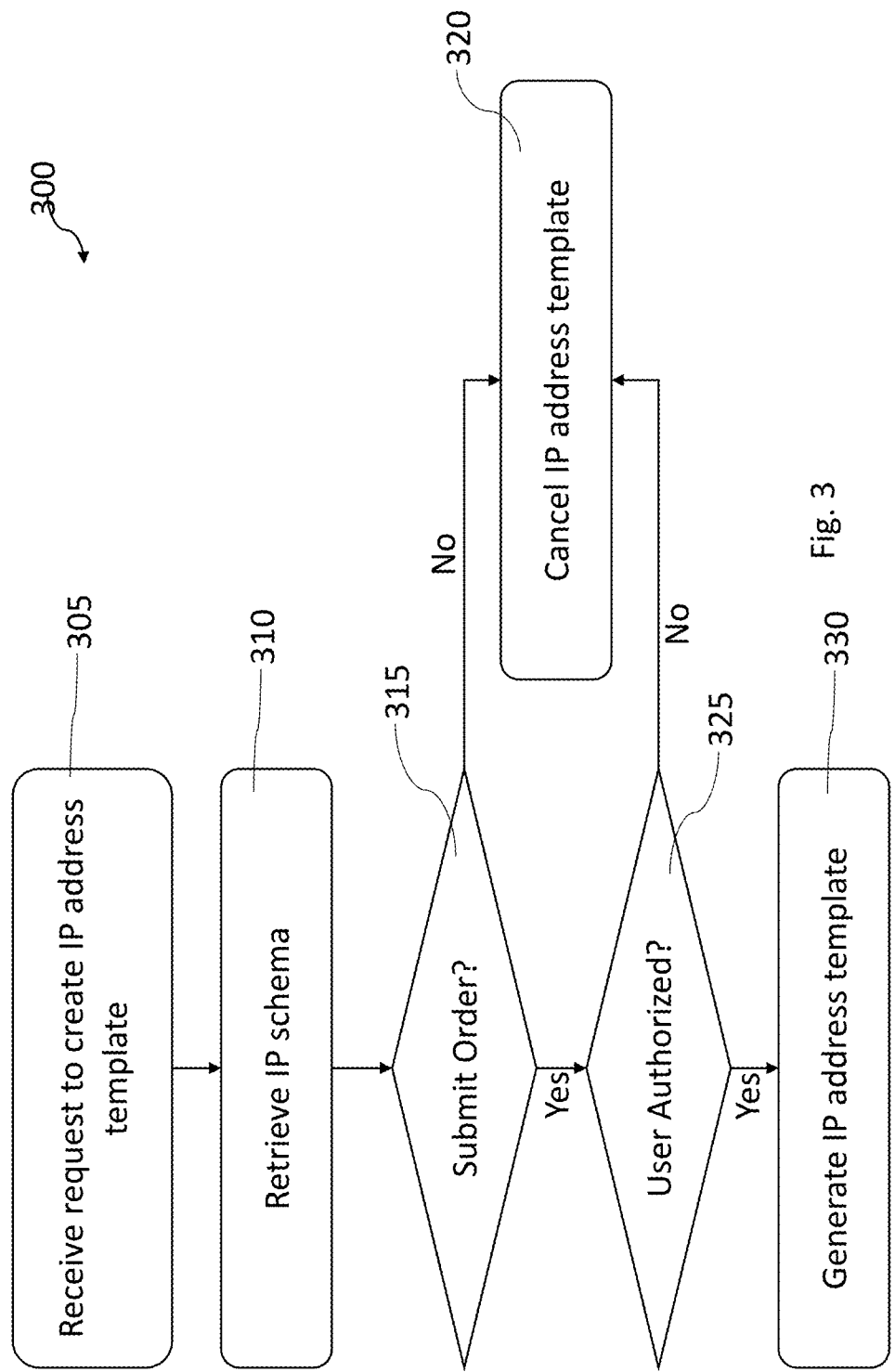
FIG. 3 is a flowchart of a method of generating an internet protocol template, according to at least one embodiment of the present system.

FIG. 3 is a flowchart of a method 300 of generating an internet protocol template, according to at least one embodiment of the present system. In some embodiments, the method 300 is implemented using the system 100 (FIG. 1). In some embodiments, the method 500 is implemented using the hardware of FIG. 5. Using the method 300 an IP address template is generated to facilitate generation of IP addresses during installation or repair of devices within a network.

In operation 305, a request to create an IP address template is received. In some embodiments, the request is received from a first user. In some embodiments, the request is received from a mobile device controllable by the first user. In some embodiments, the request is received as an electronic message, such as an email or other suitable message. In some embodiments, the request includes information related to parameters of work, such as installation or repair, to be performed. In some embodiments, the request is received wirelessly. In some embodiments, the request is received via a wired connection.

In operation 310, an IP schema is retrieved based on the received request. In some embodiments, the IP schema is retrieved from a database. In some embodiments, the IP schema is retrieved based on the information included in the request. In some embodiments, multiple IP schema are retrieved and provided to the requester for selection of a desired IP schema from amongst the multiple IP schemas. In some embodiments, the operation 310 includes receiving an input for selecting the IP schema in response to the requester being provided with multiple IP schema. In some embodiments, none of the IP schema provided to the requester are sufficient.

In operation 315, a determination is made regarding whether the requester selected any of the retrieved IP schema. In some embodiments, the determination is made based on an input received from the requested. In response to a determination that the requester selected an IP schema, the method 300 proceeds to operation 325. In response to a determination that none of the retrieved IP schema are satisfactory to the requester, the method 300 proceeds to operation 320.

In operation 320, generation of an IP address template is canceled. In some embodiments, in response to proceeding to operation 320, the requester is prompted to generate a new IP schema or provide parameters for generation of a new IP schema what would satisfy the desires of the requester. In some embodiments, the prompt includes an audio or visual prompt. In some embodiments, the prompt is transmitted to a mobile device accessible by the requester. In some embodiments, the prompt is configured to be automatically displayed on the mobile device. In some embodiments, the prompt is transmitted wirelessly. In some embodiments, the prompt is transmitted via a wired connection.

In operation 325, a determination is made regarding whether the requester is authorized to generate an IP address template. In some embodiments, the determination is made based on user identification information for the requester. In some embodiments, the determination is made based on a combination of the user identification information and a type of IP address template to be generated. In some embodiments, the determination is made automatically. In some embodiments, the determination is made by a system administrator. In some embodiments, an authorization request is automatically transmitted to the system administrator in operation 325. In some embodiments, the authorization request is transmitted wirelessly. In some embodiments, the authorization request is transmitted via a wired connection. In some embodiments, the authorization request is configured to automatically generate an alert for the system administrator. In some embodiments, the alert includes an audio or visual alert. In response to a determination that the requester is not authorized, the method 300 proceeds to operation 320. In response to a determination that the requester is authorized, the method 300 proceeds to operation 330.

In operation 330, an IP address template is generated. The IP address template is generated based on an IP schema selected by the user in operation 310. In some embodiments, the IP address template is generated based on received label information from the requester. The label information describes one or more parameters of the IP address template that correspond to encoded bits in the IP schema. In some embodiments, a set of system generated labels are created based on the label information. The set of system generated labels correspond to positionally encoded bits of the IP schema. Once the IP address template is generated, the IP address template is usable for generation of IP addresses for components within the network. In some embodiments, the IP address template is stored in a component, such as a database, for use in generating IP addresses.

In some embodiments, the method 300 includes additional operations. For example, in some embodiments, the method 300 further includes retrieving existing IP address templates for review by the requester. In some embodiments, at least one operation of the method 300 is omitted. For example, in some embodiments, the operation 325 is omitted in situations where the generation of an IP address template does not adversely impact the system. In some embodiments, an order of operations of the method 300 is adjusted. For example, in some embodiments, the operation 325 occurs prior to the operation 310 to determine whether the requester is authorized to generate an IP address template prior to providing IP schema to the requester. One of ordinary skill in the art would recognize that additional modifications to the method 300 are within the scope of this description.

Figure 4:
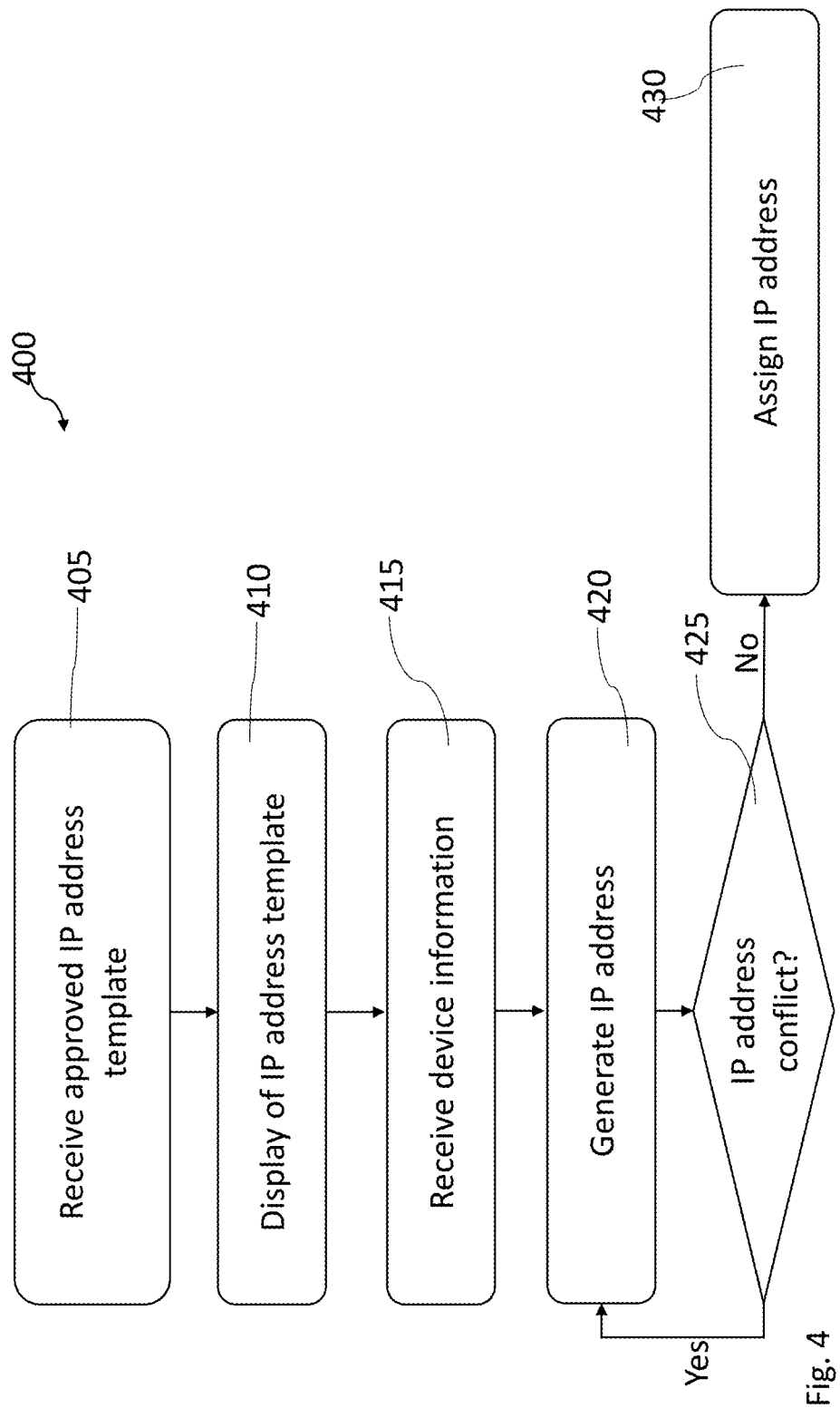
FIG. 4 is a flowchart of a method of generating an internet protocol address , according to at least one embodiment of the present system.

FIG. 4 is a flowchart of a method 400 of generating an internet protocol address, according to at least one embodiment of the present system. In some embodiments, the method 400 is implemented using the system 100 (FIG. 1). In some embodiments, the method 400 is implemented using the hardware of FIG. 5. In some embodiments, the method 400 is implemented using an IP address template generated using the method 300 (FIG. 3). Generating of the IP address using an IP address template helps to be able to precisely track devices within the network. Generating the IP address using the IP address template also assists with inventory monitoring and device identification.

In operation 405, an approved IP address template is received. The IP address template that is received is based on a type of component that is being installed or repaired. In some embodiments, the IP address template is received from a database. In some embodiments, the IP address template is received from an external device. In some embodiments, the IP address template is received wirelessly. In some embodiments, the IP address template is received via a wired connection. In some embodiments, at least a portion of information in the IP address template is automatically populated based on information for previously generated IP addresses.

In operation 410, the IP address template is displayed to a user. The displayed IP address template includes fields for receiving information from the user. In some embodiments, the user includes a technician performing installation or repair of a component of the network. In some embodiments, the IP address template is displayed on a mobile device accessible by the user. In some embodiments, the IP address template is displayed using a GUI. In some embodiments, the IP address template is displayed including an indication of fields to receive input data, such as highlighted field, colored fields or other suitably marked fields. In some embodiments, the displayed IP address template includes at least one drop down menu. In some embodiments, the displayed IP address template includes suggested data or other information for assisting the user in filling the fields of the IP address template.

In operation 415, device information is received from the user. In some embodiments, the device information is received from the user using the mobile device used to display the IP address template. In some embodiments, the device information is received by manually entering the device information. In some embodiments, the device information is received by establishing a local connection to the device, such as using Bluetooth or other suitable connections. In some embodiments, the device information is entered by populating one or more fields in the IP address template based on a serial number of other identifying information for the device. In some embodiments, the device information is received through a GUI used to display the IP address template.

In operation 420, an IP address for the device is generated based on information entered into the IP address template. In some embodiments, the IP address is generated to identify at least one of identifying information for the device, a type of device, a location of the device, a relationship of the device to other devices in the network, or other suitable information related to the device. In some embodiments, a first portion of the IP address generated includes information related to the device and a second portion of the IP address generated includes randomly generated bits. In some embodiments, a location of the first portion in the generated IP address is defined by the IP address template.

In operation 425, a determination is made regarding whether the generated IP address conflicts with another known IP address. In some embodiments, known IP addresses are stored in a database. In operation 425, the IP address generated in operation 420 is compared with the known IP addresses to determine whether the generated IP address matches any of the known IP addresses. If match for the generated IP address is found, then a conflict exists between the generated IP address and at least one known address. In response to determining that the generated IP address has a conflict, the method 400 returns to operation 420 and a new IP address is generated using the IP address template. In some embodiments, in response to the method 400 returning to operation 420, at least some of the information received in operation 415 is automatically populated into IP address template; and the new IP address is generated by performing a new generation of random bits for the IP address. In some embodiments, in response to the method 400 returning to operation 420, at least some of the information received in operation 415 is not automatically populated and the user is prompted for new device information. In response to a determination that no conflict exists for the generated IP address, the method 400 proceeds to operation 430.

In operation 430, the generated IP address is assigned to the device. In some embodiments, the assigned IP address is stored in the database for comparison with future generated IP addresses. Once the IP address is assigned to the device, the device will be accessible within the network using the assigned IP address.

In some embodiments, the method 400 includes additional operations. For example, in some embodiments, the method 400 further includes performing a test connection to the device using the assigned IP address. In some embodiments, at least one operation of the method 400 is omitted. For example, in some embodiments, the operation 425 is omitted in situations where the generation of the IP address in operation 420 includes logic to prevent duplicate IP address generation. In some embodiments, an order of operations of the method 400 is adjusted. For example, in some embodiments, the operation 415 occurs prior to the operation 410 to receive the device information and then display a completed IP address template to the user for approval. One of ordinary skill in the art would recognize that additional modifications to the method 400 are within the scope of this description.

Figure 5:
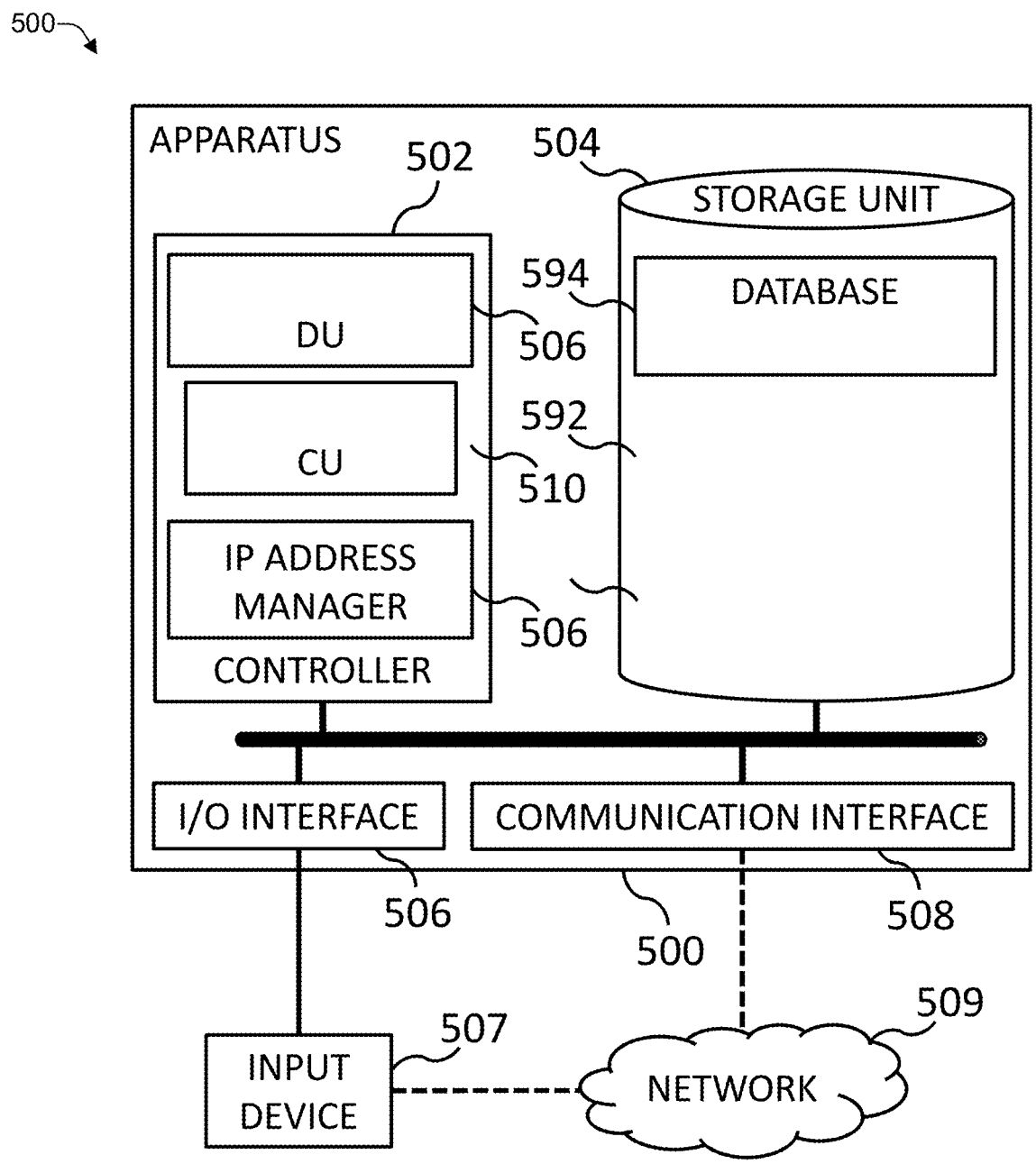
FIG. 5 is a block diagram of an exemplary hardware for generating an internet protocol address according to at least one embodiment of the present system.

FIG. 5 is a block diagram of an exemplary hardware configuration for generating IP schema and IP template, according to at least one embodiment of the system. The exemplary hardware configuration includes the system 100, which communicates with network 509, and interacts with input device 507. In at least some embodiments, apparatus 500 is a computer or other computing device that receives input or commands from input device 507. In at least some embodiments, the system 100 is a host server that connects directly to input device 507, or indirectly through network 509. In at least some embodiments, the system 100 is a computer system that includes two or more computers. In at least some embodiments, the system 100 is a personal computer that executes an application for a user of the system 100.

The system 100 includes a controller 502, a storage unit 504, a communication interface 508, and an input/output interface 506. In at least some embodiments, controller 502 includes a processor or programmable circuitry executing instructions to cause the processor or programmable circuitry to perform operations according to the instructions. In at least some embodiments, controller 502 includes analog or digital programmable circuitry, or any combination thereof. In at least some embodiments, controller 502 includes physically separated storage or circuitry that interacts through communication. In at least some embodiments, storage unit 504 includes a non-volatile computer-readable medium capable of storing executable and non-executable data for access by controller 502 during execution of the instructions. Communication interface 508 transmits and receives data from network 509. Input/output interface 506 connects to various input and output units, such as input device 507, via a parallel port, a serial port, a keyboard port, a mouse port, a monitor port, and the like to accept commands and present information.

Controller 502 includes the Radio Unit (RU) 504, the Distributed Unit (DU) 506, the centralized Unit (CU), the IP Address management server 510, the core. In some embodiments, the Radio Unit (RU) 504, a Distributed Unit (DU) 506, a centralized Unit (CU) and a core 514 are configured based on a virtual machine or a cluster of virtual machines. The DU 506, CU 510, core 514 or a combination thereof is the circuitry or instructions of controller 502 configured to process a stream of information from a DU 506, CU 510, core 514 or a combination thereof. In at least some embodiments, DU 506, CU 510, core 514 or a combination thereof is configured to receive information such as information from an open-RAN network. In at least some embodiments, the DU 506, CU 510, core 514 or a combination thereof is configured for deployment of a software service in a cloud native environment to process information in real-time. In at least some embodiments, the DU 506, CU 510, core 514 or a combination thereof records information to storage unit 504, such as the site database 890, and utilize information in storage unit 504. In at least some embodiments, the DU 506, CU 510, core 514 or a combination thereof includes subsections for performing additional functions, as described in the foregoing flow charts. In at least some embodiments, such sub-sections may be referred to by a name associated with their function.

In at least some embodiments, the apparatus is another device capable of processing logical functions to perform the operations herein. In at least some embodiments, the controller and the storage unit need not be entirely separate devices but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all the blocks of flowcharts and block diagrams described herein. Various embodiments of the present system are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR XOR, NAND, NOR, and other logical operations, flip-flops, registers, memory elements, etc., such as field-programmable gate arrays (FPGA), programmable logic arrays (PLA), etc.

Various embodiments of the present system include a system, a method, and/or a computer program product. In some embodiments, the computer program product includes a computer readable storage medium (or media) having computer readable program instructions thereon for causing a processor to carry out aspects of the present system. In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, to perform aspects of the present system.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

An aspect of this description relates to a computer-readable medium including instructions executable by a computer. The instructions are configured to cause the computer to receive, from a first user, a request to create an Internet Protocol (IP) template for a device connected to a network. The instructions are configured to cause the computer to receive an IP schema for the network. The instructions are configured to cause the computer to receive a list of IP template parameters associated with the network, wherein the IP template parameters includes information about a part of the network. The instructions are configured to cause the computer to determine whether the first user is authorized to create the IP template. The instructions are configured to cause the computer to generate, in response to a determination that the first user is authorized, an IP template based on the IP template parameters and the IP schema for the part of the network.

In some embodiments, the instructions executable by the computer are configured to cause the computer to receive a set of user defined labels that describe one or more parameters in the IP template parameters that correspond to positionally encoded bits in the IP schema;
determine a set of system generated labels that describe one or more parameters in the IP template parameters that in turn correspond to positionally encoded bits in the IP schema; and generate an IP address based on the IP template, the user defined labels, and the system generated labels. In some embodiments, the instructions executable by the computer are configured to cause the computer to generate an alert in response to a determination that the first user is not authorized; and transmit the alert to the first user or another user. In some embodiments, the instructions executable by the computer are configured to cause the computer to generate a graphical user interface for receiving information from the first user based on the IP template. In some embodiments, the instructions executable by the computer are configured to cause the computer to generate an IP address using the IP Template to determine a first set of bits of the IP address, wherein the first set of bits is less than an entirety of the bits of the IP address. In some embodiments, the instructions executable by the computer are configured to cause the computer to receive a request from the first user to generate an IP address for a deployment; request additional information from the first user based on the IP schema and the IP template; and based on the additional information generate the IP address. In some embodiments, the instructions executable by the computer are configured to cause the computer to determine whether the IP address conflicts with an existing address. In some embodiments, the instructions executable by the computer are configured to cause the computer to block the IP address in response to a determination that the IP address conflicts with an existing address.

An aspect of this description relates to a method. The method includes receiving, from a first user, a request to create an Internet Protocol (IP) template for a device connected to a network. The method further includes receiving an IP schema for the network. The method further includes receiving a list of IP template parameters associated with the network, wherein the IP template parameters includes information about a part of the network. The method further includes determining whether the first user is authorized to create the IP template. The method further includes generating, in response to a determination that the first user is authorized, an IP template based on the IP template parameters and the IP schema for the part of the network. The method further includes generating an IP address based on the IP template. In some embodiments, the method further includes receiving a set of user defined labels that describe one or more parameters in the IP template parameters that correspond to positionally encoded bits in the IP schema; determining a set of system generated labels that describe one or more parameters in the IP template parameters that in turn correspond to positionally encoded bits in the IP schema; and generating the IP address based on the IP template, the user defined labels, and the system generated labels. In some embodiments, the method further includes generating an alert in response to a determination that the first user is not authorized; and transmitting the alert to the first user or another user. In some embodiments, generating the IP address comprises generating the IP address using the IP template to determine a first set of bits of the IP address, and the first set of bits is less than an entirety of the bits of the IP address. In some embodiments, the method further includes
  receiving a request from the first user to generate an IP address for a deployment; requesting additional information from the first user based on the IP schema and the IP template; and generating the IP address based on the additional information. In some embodiments, the method further includes determining whether the IP address conflicts with an existing address; and blocking the IP address in response to a determination that the IP address conflicts with an existing address. In some embodiments, the method further includes generating a graphical user interface for receiving information from the first user based on the IP template.

An aspect of this description relates to a system. The system includes a controller including circuitry. The controller is configured to receive, from a first user, a request to create an Internet Protocol (IP) template for a device connected to a network. The controller is configured to receive an IP schema for the network. The controller is configured to receive a list of IP template parameters associated with the network, wherein the IP template parameters includes information about a part of the network. The controller is configured to determine whether the first user is authorized to create the IP template. The controller is configured to generate, in response to a determination that the first user is authorized, an IP template based on the IP template parameters and the IP schema for the part of the network. In some embodiments, the controller is configured to receive a set of user defined labels that describe one or more parameters in the IP template parameters that correspond to positionally encoded bits in the IP schema; determine a set of system generated labels that describe one or more parameters in the IP template parameters that in turn correspond to positionally encoded bits in the IP schema; and generate an IP address based on the IP template, the user defined labels, and the system generated labels. In some embodiments, the controller is configured to generate an IP address using the IP Template to determine a first set of bits of the IP address, wherein the first set of bits is less than an entirety of the bits of the IP address. In some embodiments, the controller is configured to receive a request from the first user to generate an IP address for a deployment; request additional information from the first user based on the IP schema and the IP template; and based on the additional information generate the IP address. In some embodiments, the controller is configured to determine whether the IP address conflicts with an existing address; and block the IP address in response to a determination that the IP address conflicts with an existing address.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for generating an Internet Protocol (IP) address template, the system comprising:
    a controller including circuitry configured to:
        receive, from a first user, a request to create an IP address template for a device connected to a network;
        receive an IP schema for the network;
        receive a list of IP address template parameters associated with the network, wherein the IP address template parameters includes information about a part of the network;
        determine whether the first user is authorized to create the IP address template; and
        generate, in response to a determination that the first user is authorized, an IP address template based on the IP address template parameters and the IP schema for the part of the network.

2. The system of claim 1, wherein the controller is configured to:
    receive a set of user defined labels that describe one or more parameters in the IP address template parameters that correspond to positionally encoded bits in the IP schema;
    determine a set of system generated labels that describe one or more parameters in the IP address template parameters that in turn correspond to positionally encoded bits in the IP schema; and
    generate an IP address based on the IP address template, the user defined labels, and the system generated labels.

3. The system of claim 1, wherein the controller is configured to:
    generate an IP address using the IP address template to determine a first set of bits of the IP address, wherein the first set of bits is less than an entirety of the bits of the IP address.

4. The system of claim 1, wherein the controller is configured to:
    receive a request from the first user to generate an IP address for a deployment;
    request additional information from the first user based on the IP schema and the IP address template; and
    based on the additional information generate the IP address.

5. The system of claim 4, wherein the controller is configured to:
    determine whether the IP address conflicts with an existing IP address; and
    block the IP address in response to a determination that the IP address conflicts with the existing IP address.

6. A method of generating an Internet Protocol (IP) address, the method comprising:
    receiving, from a first user, a request to create an IP address template for a device connected to a network;
    receiving an IP schema for the network;
    receiving a list of IP address template parameters associated with the network, wherein the IP address template parameters includes information about a part of the network;
    determining whether the first user is authorized to create the IP address template;
    generating, in response to a determination that the first user is authorized, an IP template based on the IP address template parameters and the IP schema for the part of the network; and
    generating the IP address based on the IP address template.

7. The method of claim 6, further comprising:
    receiving a set of user defined labels that describe one or more parameters in the IP address template parameters that correspond to positionally encoded bits in the IP schema;
    determining a set of system generated labels that describe one or more parameters in the IP address template parameters that in turn correspond to positionally encoded bits in the IP schema; and
    generating the IP address based on the IP address template, the user defined labels, and the system generated labels.

8. The method of claim 6, further comprising:
    generating an alert in response to a determination that the first user is not authorized, wherein the first user is authorized to access the network; and
    transmitting the alert to the first user or another user.

9. The method of claim 6, wherein generating the IP address comprises generating the IP address using the IP address template to determine a first set of bits of the IP address, and the first set of bits is less than an entirety of the bits of the IP address.

10. The method of claim 6, further comprising:
receiving a request from the first user to generate an IP address for a deployment;
requesting additional information from the first user based on the IP schema and the IP address template; and
generating the IP address based on the additional information.

11. The method of claim 6, further comprising:
determining whether the IP address conflicts with an IP existing address; and
blocking the IP address in response to a determination that the IP address conflicts with the existing IP address.

12. The method of claim 6, further comprising:
generating a graphical user interface for receiving information from the first user based on the IP address template.

13. A computer-readable medium including instructions executable by a computer to cause the computer to perform operations for generating an Internet Protocol (IP) address, the operations comprising:
receive, from a first user, a request to create an IP address template for a device connected to a network;
receive an IP schema for the network;
receive a list of IP address template parameters associated with the network, wherein the IP address template parameters includes information about a part of the network;
determine whether the first user is authorized to create the IP address template; and
generate, in response to a determination that the first user is authorized, the IP address template based on the IP address template parameters and the IP schema for the part of the network.

14. The computer-readable medium of claim 13, wherein the instructions executable by the computer are configured to cause the computer to:
receive a set of user defined labels that describe one or more parameters in the IP address template parameters that correspond to positionally encoded bits in the IP schema;
determine a set of system generated labels that describe one or more parameters in the IP address template parameters that in turn correspond to positionally encoded bits in the IP schema; and
generate the IP address based on the IP address template, the user defined labels, and the system generated labels.

15. The computer-readable medium of claim 13, wherein the instructions executable by the computer are configured to cause the computer to:
generate an alert in response to a determination that the first user is not authorized; and
transmit the alert to the first user or another user.

16. The computer-readable medium of claim 13, wherein the instructions executable by the computer are configured to cause the computer to:
generate a graphical user interface for receiving information from the first user based on the IP address template.

17. The computer-readable medium of claim 13, wherein the instructions executable by the computer are configured to cause the computer to:
generate the IP address using the IP address template to determine a first set of bits of the IP address, wherein the first set of bits is less than an entirety of the bits of the IP address.

18. The computer-readable medium of claim 13, wherein the instructions executable by the computer are configured to cause the computer to:
receive a request from the first user to generate the IP address for a deployment;
request additional information from the first user based on the IP schema and the IP address template; and
based on the additional information generate the IP address.

19. The computer-readable medium of claim 18, wherein the instructions executable by the computer are configured to cause the computer to:
determine whether the IP address conflicts with an existing IP address.

20. The computer-readable medium of claim 19, wherein the instructions executable by the computer are configured to cause the computer to:
block the IP address in response to a determination that the IP address conflicts with the existing IP address.

* * * * *